(12) United States Patent
Mutter et al.

(10) Patent No.: US 12,284,264 B2
(45) Date of Patent: Apr. 22, 2025

(54) SUBSCRIBER STATION FOR A SERIAL BUS SYSTEM, AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Franz Bailer, Moessingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 292 days.

(21) Appl. No.: 18/040,242

(22) PCT Filed: Jul. 15, 2021

(86) PCT No.: PCT/EP2021/069845
§ 371 (c)(1),
(2) Date: Feb. 17, 2023

(87) PCT Pub. No.: WO2022/028851
PCT Pub. Date: Feb. 10, 2022

(65) Prior Publication Data
US 2023/0283451 A1    Sep. 7, 2023

(30) Foreign Application Priority Data
Aug. 5, 2020 (DE) ................... 10 2020 209 918.9

(51) Int. Cl.
*H04L 7/033* (2006.01)
*H04L 12/40* (2006.01)
(Continued)

(52) U.S. Cl.
CPC ...... *H04L 7/0331* (2013.01); *H04L 12/40169* (2013.01); *H04L 12/413* (2013.01);
(Continued)

(58) Field of Classification Search
CPC ............ H04L 7/0331; H04L 12/40169; H04L 12/413; H04L 25/4902; H04L 2012/40215;
(Continued)

(56) References Cited

FOREIGN PATENT DOCUMENTS

| DE | 102011122845 A1 | 1/2013 |
|---|---|---|
| DE | 102018221958 A1 | 6/2020 |
| EP | 2712123 A1 | 3/2014 |

OTHER PUBLICATIONS

Berisa et al. "Comparative Evalutation of Various Generations of CAN Based on Timing Analysis" 2023 IEEE ETFA (Year: 2023).*

(Continued)

*Primary Examiner* — Basil Ma
(74) *Attorney, Agent, or Firm* — NORTON ROSE FULBRIGHT US LLP; Gerard A. Messina

(57) ABSTRACT

A subscriber station for a serial bus system and a method for communication. The subscriber station has a communication control device controlling a communication of the subscriber station with at least one other subscriber station of the bus system and generating a transmit signal. The communication control device generates the transmit signal according to a frame and to insert a field having a rising edge and a subsequent falling edge into the frame for the transition from a first communication phase to a second communication phase. The field has a predetermined length between the rising edge and the subsequent falling edge such that a sampling time at which a communication control device of the at least one other subscriber station of the bus system will sample the first bit of the second communication phase is situated between the rising edge and the subsequent falling edge.

14 Claims, 5 Drawing Sheets

(51) Int. Cl.
H04L 12/413 (2006.01)
H04L 25/49 (2006.01)

(52) U.S. Cl.
CPC .................. *H04L 25/4902* (2013.01); *H04L 2012/40215* (2013.01); *H04L 2012/40273* (2013.01)

(58) Field of Classification Search
CPC ........... H04L 2012/40273; H04L 7/033; H04L 12/4135; H04J 3/0658
See application file for complete search history.

(56) References Cited

OTHER PUBLICATIONS

Can XL—The Next Step in Can Evolution from https://www.bosch-semiconductors.com/media/ip_modules/pdf_2/can_xl_1/20230717_can_xl_overview.pdf (Year: 2023).*
ISO 11898-1:2015 Standard, "Road Vehicles—Controller Area Network (CAN)—Part 1: Data Link Layer and Physical Signalling," 2015.
International Search Report for PCT/EP2021/069845, Issued Oct. 27, 2021.

* cited by examiner

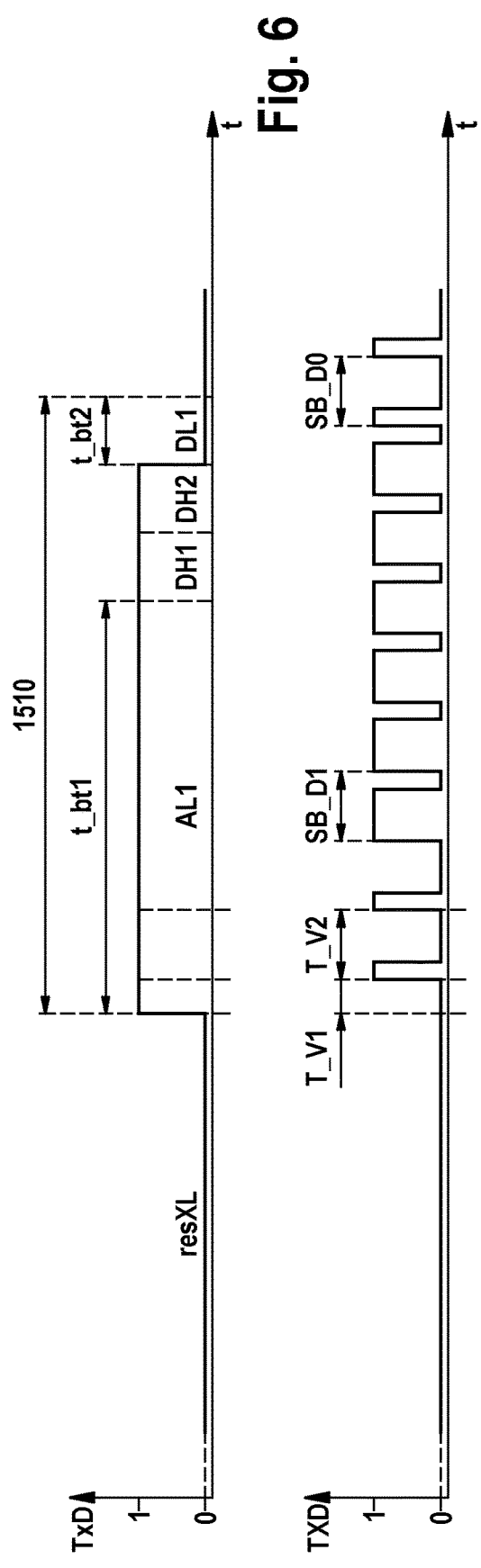
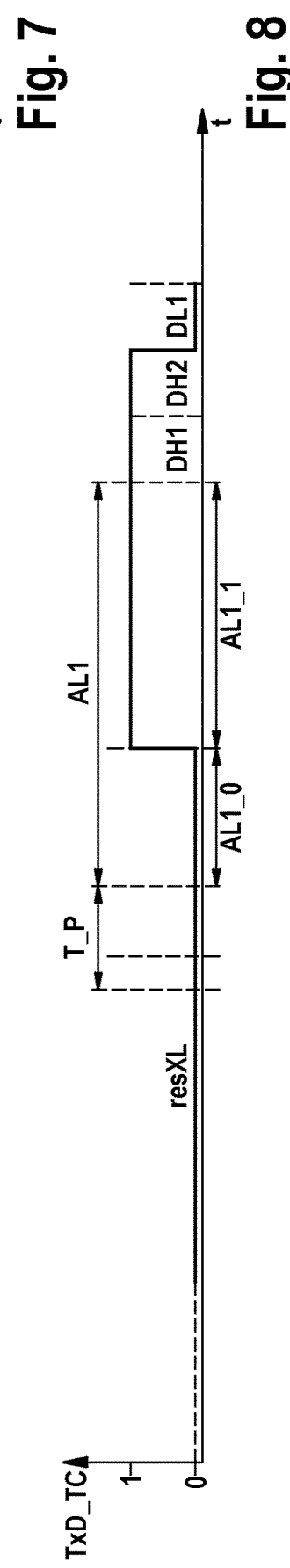
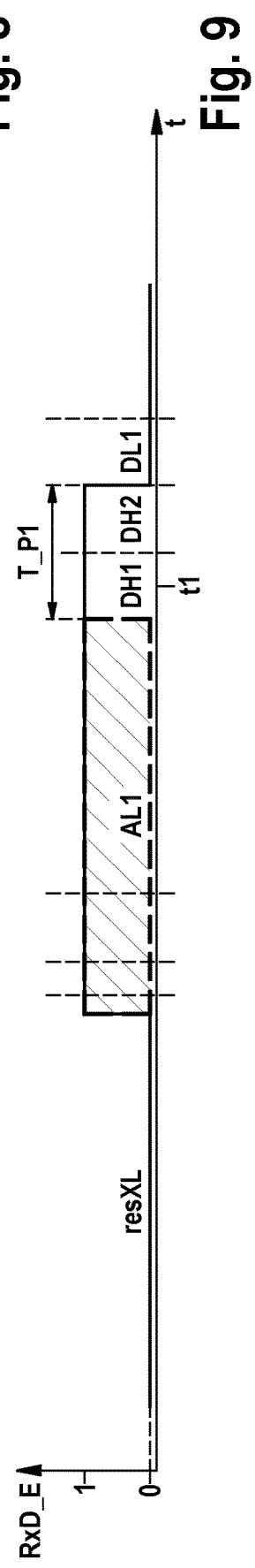
Fig. 6
Fig. 7
Fig. 8
Fig. 9

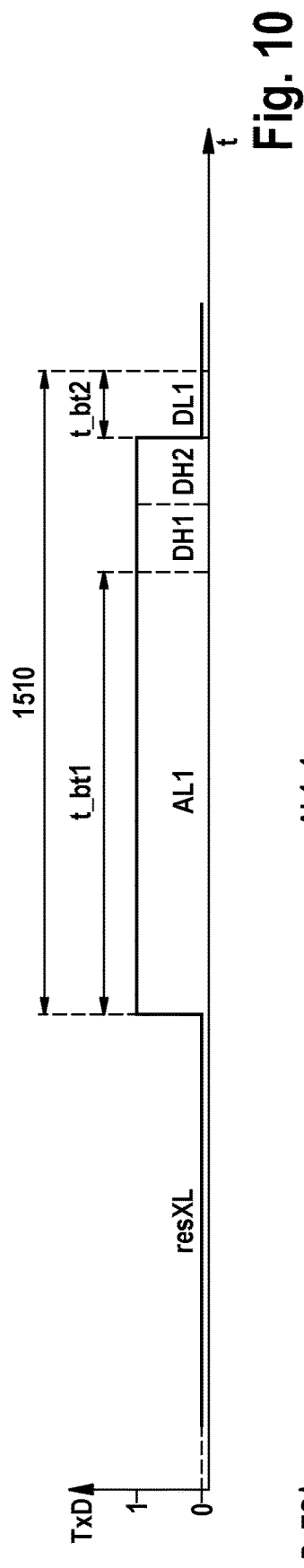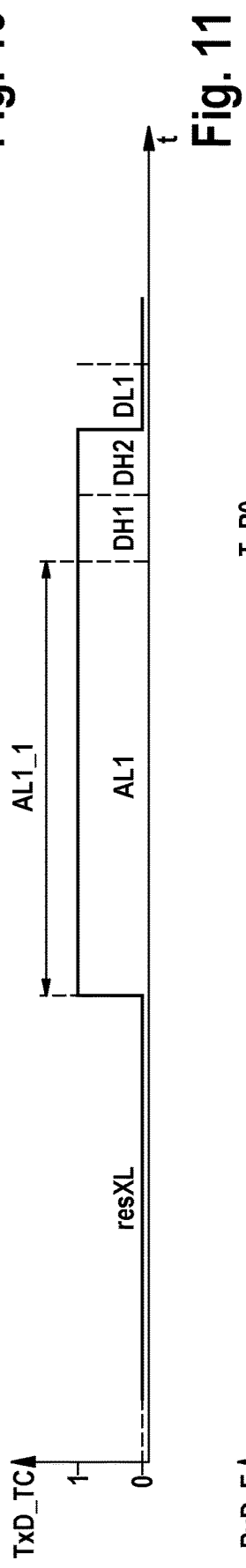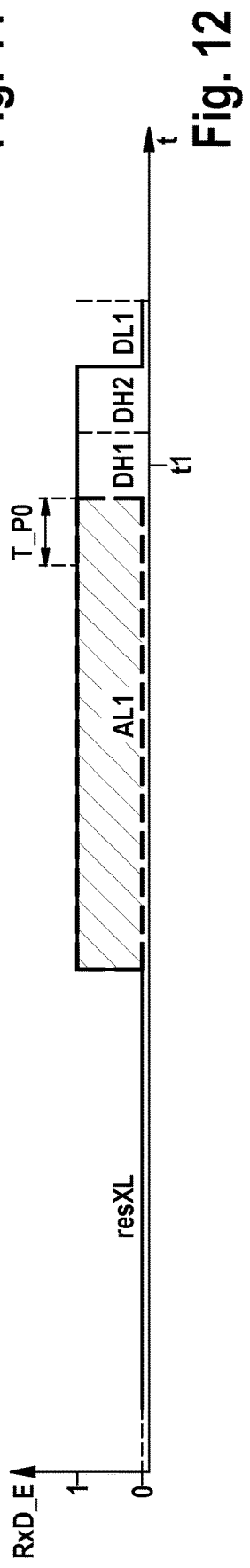

SUBSCRIBER STATION FOR A SERIAL BUS SYSTEM, AND METHOD FOR COMMUNICATION IN A SERIAL BUS SYSTEM

FIELD

The present invention relates to a subscriber station for a serial bus system and to a method for communication in a serial bus system that operates with a high data rate and with great flexibility and great error robustness.

BACKGROUND INFORMATION

Bus systems for communication between sensors and control devices, for example in vehicles, are intended to enable the transmission of a large amount of data, depending on the number of functions of a technical system or vehicle. In this context, it is often required that the data be transmitted from the sender to the receiver faster than was previously the case, and that large data packets also be transferable as needed.

For vehicles, a bus system is currently in the introduction phase in which data are transmitted as messages in the ISO 11898-1:2015 standard as a CAN protocol specification with CAN FD. The messages are transmitted between the bus subscribers of the bus system, such as sensor, control device, encoder, etc. For this purpose, the message is sent to the bus in a frame in which switching takes place between two communication phases. In the first communication phase (arbitration), it is negotiated which of the subscriber stations of the bus system is permitted to send its frame to the bus in the subsequent second communication phase (data phase, or sending of useful data). CAN FD is used by most manufacturers in the first step, with 500 kbit/s arbitration bit rate and 2 Mbit/s data bit rate in the vehicle. It is therefore necessary to switch back and forth between a slow operating mode and a fast operating mode during transmission on the bus.

To enable even higher data rates in the second communication phase, a successor bus system to CAN FD is currently being developed, called CAN XL, which is currently being standardized at the organization CAN in Automation (CiA). In addition to pure data transport via the CAN bus, CAN XL is also intended to support other functions such as functional safety, data security, and quality of service (QoS). These are elementary properties that are required in an autonomously driving vehicle.

CAN XL is intended to support high bit rates in the data phase, for example up to 15 Mbit/s or even 20 Mbit/s. To achieve this, corresponding transceivers, so-called CAN XL transceivers, are currently also being standardized. The operating mode of these transceivers is switchable, in order to achieve the required high bit rates in the data phase. In contrast, the bit rate in the arbitration phase remains at about 500 kbit/s, in order to enable the arbitration. As a result, CAN XL has to support a very high bit rate ratio. A bit rate ratio of 40 is possible, which corresponds to 20 Mbit/s in the data phase (high bit rate) to 500 kbit/s in the arbitration phase (low bit rate).

In CAN XL, a communication control device signals to the transceiver that the transceiver has to switch its operating mode. For signaling, the communication control device, in particular its protocol controller, uses a coding by pulse width modulation, which is also called PWM coding. The transceiver is in particular a CAN SIC XL transceiver.

A problem is that the PWM coding in the communication control device and the corresponding PWM decoding in the transceiver device cause a time offset (delay).

In addition, it is to be noted that with CAN the clock pulses may have a certain tolerance.

A further problem is that the three effects described, namely high bit rate ratio, PWM coding/decoding, clock tolerance, together result in a large phase error at a subscriber station, which is currently only a receiver of a message transmitted over the bus. Such subscriber stations can also be referred to as receiving nodes.

In the worst case, a "fast" receiving node tries to sample the first bit of the data phase (DH1 bit) before the DH1 bit has arrived at the receiving node, and/or a "slow" receiving node samples the DH1 bit only after the DH1 bit has already passed on the bus. In both cases, this results in an invalid frame in the receiving node. This lowers the net data rate that can be transmitted in the bus system, because some frames have to be retransmitted.

This means that the phase error at a subscriber station has the result that the bit rate switchover from the low to the high bit rate within the CAN frame cannot take place correctly under all circumstances. However, without a reliable switching over of the bit rate, reliable and robust communication is not possible.

SUMMARY

It is an object of the present invention to provide a subscriber station for a serial bus system and a method for communication in a serial bus system which solve the problems named above. In particular, a subscriber station for a serial bus system and a method for communication in a serial bus system are to be provided in which a high error robustness of the communication can be realized even at a high data rate and an increase in the amount of user data per frame.

The object may be solved by a subscriber station for a serial bus system having the features of the present invention. According to an example embodiment of the present invention, the subscriber station has a communication control device for controlling a communication of the subscriber station with at least one other subscriber station of the bus system so that, for a message exchanged between subscriber stations of the bus system, the bit time of a signal transmitted to the bus in the first communication phase may be different from a bit time of a signal transmitted in the second communication phase, and a transceiver device for transmitting the transmit signal to a bus of the bus system, the communication control device being designed to generate the transmit signal according to a frame and to insert a field having a rising edge and a subsequent falling edge into the frame for the transition from the first communication phase to the second communication phase, and the field having a predetermined length between the rising edge and the subsequent falling edge such that a sampling time at which a communication control device of the at least one other subscriber station of the bus system will sample the first bit of the second communication phase is situated between the rising edge and the subsequent falling edge.

Due to the design of the subscriber station, there is a modified ADS field that ensures that the bit rate switching from the low bit rate to the high bit rate within the CAN frame can occur correctly under all circumstances. In particular, bit rate switching during the transition from the first communication phase (arbitration phase) to the second communication phase (data phase) functions reliably even when there is a high phase error. In particular, the subscriber station can correctly sample the first bit of the second communication phase (data phase) and then the subsequent bits of the second communication phase (data phase) despite phase errors.

With the subscriber station, in this way reliable and robust communication with CAN XL is thus first made possible. This also holds for extreme settings of the system parameters, such as clock tolerance, PWM symbol length, bit timing setting, or other parameters of the bus system.

It is also advantageous that the described design of the subscriber station for solving the named task can be realized in an uncomplicated and thus cost-effective manner.

Thus, with the subscriber station in the bus system, it is possible to maintain an arbitration from CAN in a first communication phase and nonetheless to again significantly increase the transmission rate compared to CAN or CAN FD.

According to an example embodiment of the present invention, the method carried out by the subscriber station can also be used if there is also at least one CAN subscriber station and/or at least one CAN FD subscriber station in the bus system that send messages according to the CAN protocol and/or CAN FD protocol.

Advantageous further embodiments of the subscriber station are disclosed herein.

It is possible for the predetermined length of the field to have at least three bits with the bit time of the second communication phase.

The falling edge can define the start of a predetermined bit of the second communication phase. The edge can be provided for synchronization to the communication on the bus for a communication control device of the at least one other subscriber station of the bus system.

It is possible for the communication control device to be designed to insert the field as a bit sequence having the logical value 1110.

In an example embodiment of the present invention, the communication control device can be configured to insert a bit with the bit time of the first communication phase in the field before the falling edge and, following this, a bit with the bit time of the second communication phase, the communication control device being designed to additionally insert a number of M bits with the bit time of the second communication phase following the bit with the bit time of the second communication phase, each of which bits has the same logical value 1 as the first bit of the second communication phase, and M being a natural number greater than or equal to 1.

The communication control device can act as a receiving node in the second communication phase, so that the communication control device acts only as a receiver but not as a transmitter of the frame to the bus, the communication control device being designed to tolerate, in the field starting from and including the sampling time at which the communication control device samples the first bit of the second communication phase, and before the falling edge of the field, a number of N bits with the bit time of the second communication phase, each having the logical value 1, where N is a natural number greater than or equal to 1, and the communication control device being designed to use the falling edge of the field to synchronize to the communication on the bus.

It is possible for the subscriber station to also have the transceiver device for transmitting the transmit signal to a bus of the bus system, the communication control device being designed to signal to the transceiver device, by pulse width modulation in the transmit signal, that the transceiver device has to switch its operating mode. Here, the communication control device can be designed to signal to the transceiver device directly after the rising edge of the field, by pulse width modulation in the transmit signal, that the transceiver device has to switch its operating mode from the operating mode of the first communication phase to a different operating mode of the second communication phase.

In an example embodiment of the present invention, the communication control device uses S directly successive PWM symbols in the transmit signal to signal to the transceiver device which operating mode of the second communication phase the transceiver device has to switch its operating mode to, where S is a natural number greater than or equal to 1.

According to an exemplary embodiment of the present invention, the communication control device is designed to send at least the last part of a bit which has the bit time of the first communication phase with the same logical value as the first bit in the field, which has the bit time of the second communication phase.

According to another example embodiment of the present invention, the transceiver device is designed to transmit the entire frame to the bus in the operating mode for transmitting and receiving the frame in the first communication phase.

It is possible for the frame formed for the message to be designed to be compatible with CAN FD, it being negotiated, in the first communication phase, which of the subscriber stations of the bus system is given at least temporary exclusive, collision-free access to the bus in the subsequent second communication phase.

The subscriber station described above can be part of a bus system that also includes a bus and at least two subscriber stations that are connected to each other via the bus in such a way that they can communicate with each other serially. Here, at least one of the at least two subscriber stations is an above-described subscriber station.

The object named above may further be solved by a method for communication in a serial bus system according to an example embodiment of the present invention. According to an example embodiment of the present invention, the method is carried out with a subscriber station of the bus system having a communication control device and a transceiver device, the method including the steps of controlling, with the communication control device, a communication of the subscriber station with at least one other subscriber station of the bus system so that, for a message exchanged between subscriber stations of the bus system, the bit time of a signal transmitted to the bus in the first communication phase can differ from a bit time of a signal transmitted in the second communication phase, and transmitting, with the transceiver device, the transmit signal to a bus of the bus system, the communication control device generating the transmit signal according to a frame and inserting into the frame, for the transition from the first communication phase to the second communication phase, a field with a rising edge and a subsequent falling edge, and the field between the rising edge and the subsequent falling edge having a predetermined length such that a sampling time at which a communication control device of the at least one other subscriber station of the bus system will sample the first bit of the second communication phase is situated between the rising edge and the subsequent falling edge.

The method offers the same advantages as named above with respect to the subscriber station.

Other possible implementations of the present invention also include combinations, not explicitly mentioned, of features or specific embodiments described above or in the following with respect to the exemplary embodiments. In this context, the person skilled in the art will also add individual aspects as improvements or additions to the respective basic form of the present invention.

BRIEF DESCRIPTION OF THE DRAWINGS

The present invention is described in more detail below with reference to the figures and with reference to exemplary embodiments.

FIG. 6 through FIG. 8 show, respectively, a temporal course of a signal that occurs when a frame is transmitted at terminals of the subscriber station according to the first exemplary embodiment when the subscriber station is the transmitter of the message, upon the transmission of which a switchover of the operating mode of the transceiver device is carried out, according to an example embodiment of the present invention.

FIG. 9 shows the temporal course of signal states that a receiving node expects as a receive signal at its receiving terminal when another subscriber station is the transmitter of the message and thus generates signals according to FIG. 6 to FIG. 8.

FIG. 10 and FIG. 11 respectively show a temporal course of a signal that occurs when a frame is transmitted at terminals of a subscriber station according to a second exemplary embodiment when the subscriber station is the transmitter of the message, upon transmission of which a switchover of the operating mode of the transceiver station is not carried out.

FIG. 12 shows the temporal course of signal states that a receiving node expects as a receive signal at its receiving terminal when another subscriber station is the transmitter of the message and thus generates signals according to FIG. 10 and FIG. 11.

In the figures, identical or functionally identical elements are provided with the same reference signs, unless otherwise indicated.

DETAILED DESCRIPTION OF EXAMPLE EMBODIMENTS

Figure 1:
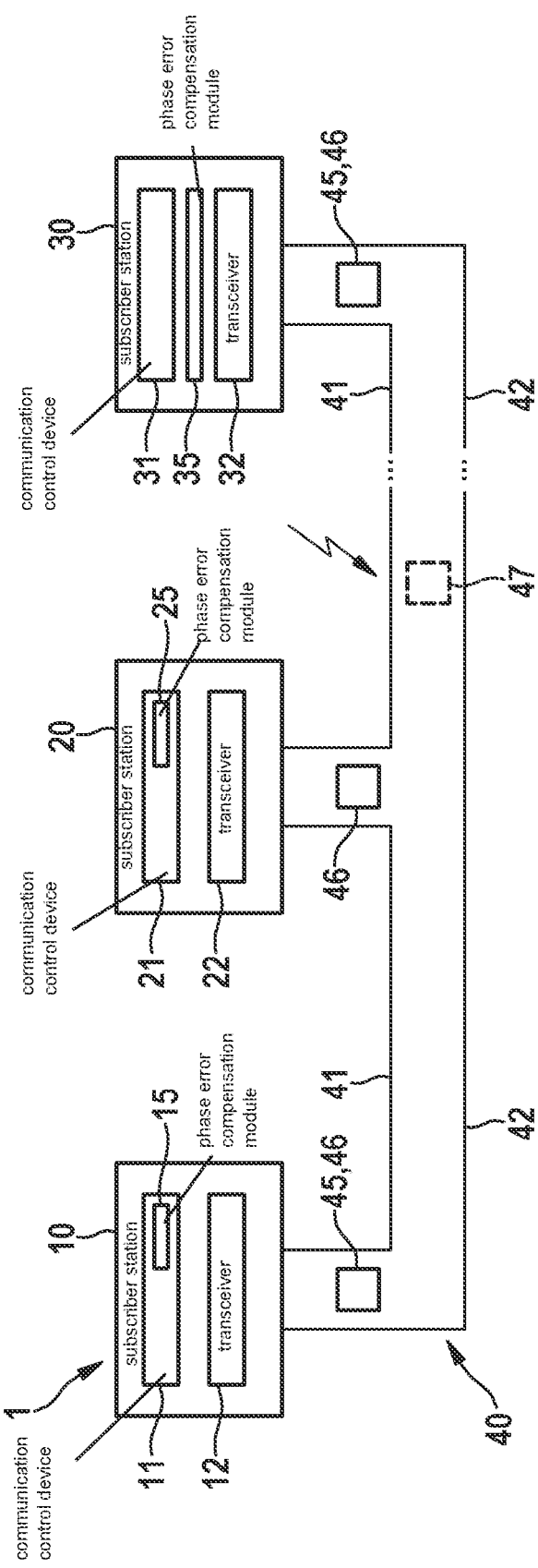
FIG. 1 shows a simplified block diagram of a bus system according to a first exemplary embodiment of the present invention.

FIG. 1 shows as an example a bus system 1, which is fundamentally designed in particular for a CAN bus system, a CAN FD bus system, a CAN XL bus system, and/or modifications thereof, as described below. Bus system 1 may be used in a vehicle, in particular a motor vehicle, an aircraft, etc., or in a hospital, etc.

In FIG. 1, bus system 1 has a multiplicity of subscriber stations 10, 20, 30, each connected to a bus 40 with a first bus wire 41 and a second bus wire 42. Bus wires 41, 42 can also be called CAN_H and CAN_L, or CAN-XL_H and CAN-XL_L, and are used for electrical signal transmission after coupling in of the dominant levels or generation of recessive levels or other levels for a signal in the transmit state. Messages 45, 46 in the form of signals are serially transmittable between the individual subscriber stations 10, 20, 30 via bus 40. If an error occurs during communication on the bus 40, as shown by the jagged black block arrow in FIG. 1, an error frame 47 (error flag) can optionally be sent. Subscriber stations 10, 20, 30 are for example control devices, sensors, display devices, etc. of a motor vehicle.

As shown in FIG. 1, subscriber station 10 has a communication control device 11, a transceiver device 12, and a phase error compensation module 15. Subscriber station 20 has a communication control device 21, a transceiver device 22, and optionally a phase error compensation module 25. Subscriber station 30 has a communication control device 31, a transceiver device 32, and a phase error compensation module 35. Transceiver devices 12, 22, 32 of subscriber stations 10, 20, 30 are each connected directly to bus 40, although this is not illustrated in FIG. 1.

Communication control devices 11, 21, 31 are each used for controlling a communication of the respective subscriber station 10, 20, 30 via bus 40 with at least one other subscriber station of the subscriber stations 10, 20, 30 connected to bus 40.

Communication control devices 11, 31 create and read first messages 45, which are for example modified CAN messages 45.

Here, the modified CAN messages 45 are constructed on the basis of a CAN XL format, which is described in more detail with reference to FIG. 2, and in which the respective phase error compensation module 15, 35 is used. The communication control devices 11, 31 can further be realized to provide a CAN XL message 45 or a CAN FD message 46 for the transceiver device 32, or to receive it therefrom, as needed. The respective phase error compensation modules 15, 35 are also used here. The communication control devices 11, 31 thus create and read a first message 45 or second message 46, the first and second messages 45, 46 differing in their data transmission standard, namely in this case CAN XL or CAN FD.

The communication control device 21 may be designed like a conventional CAN controller according to ISO 11898-1:2015, i.e. like a CAN FD-tolerant classical CAN controller or a CAN FD controller. In addition, phase error compensation module 25 is optionally provided, which has the same function as phase error compensation modules 15, 35. Communication control device 21 creates and reads second messages 46, for example CAN FD messages 46. CAN FD messages 46 can have a number of data bytes from 0 to 64, which are in addition transmitted at a significantly faster data rate than in a classical CAN message transmission. In particular, communication control device 21 is designed like a conventional CAN FD controller.

Transceiver device 22 can be designed like a conventional CAN transceiver according to ISO 11898-1:2015, or CAN FD transceiver. Transceiver devices 12, 32 can be realized to provide messages 45 according to the CAN XL format or messages 46 according to the current CAN FD format for the associated communication control device 11, 31, or to receive them therefrom, as needed.

With the two subscriber stations 10, 30, a formation and then transmission of messages 45 with the CAN XL format, and reception of such messages 45, can be realized.

Figure 2:
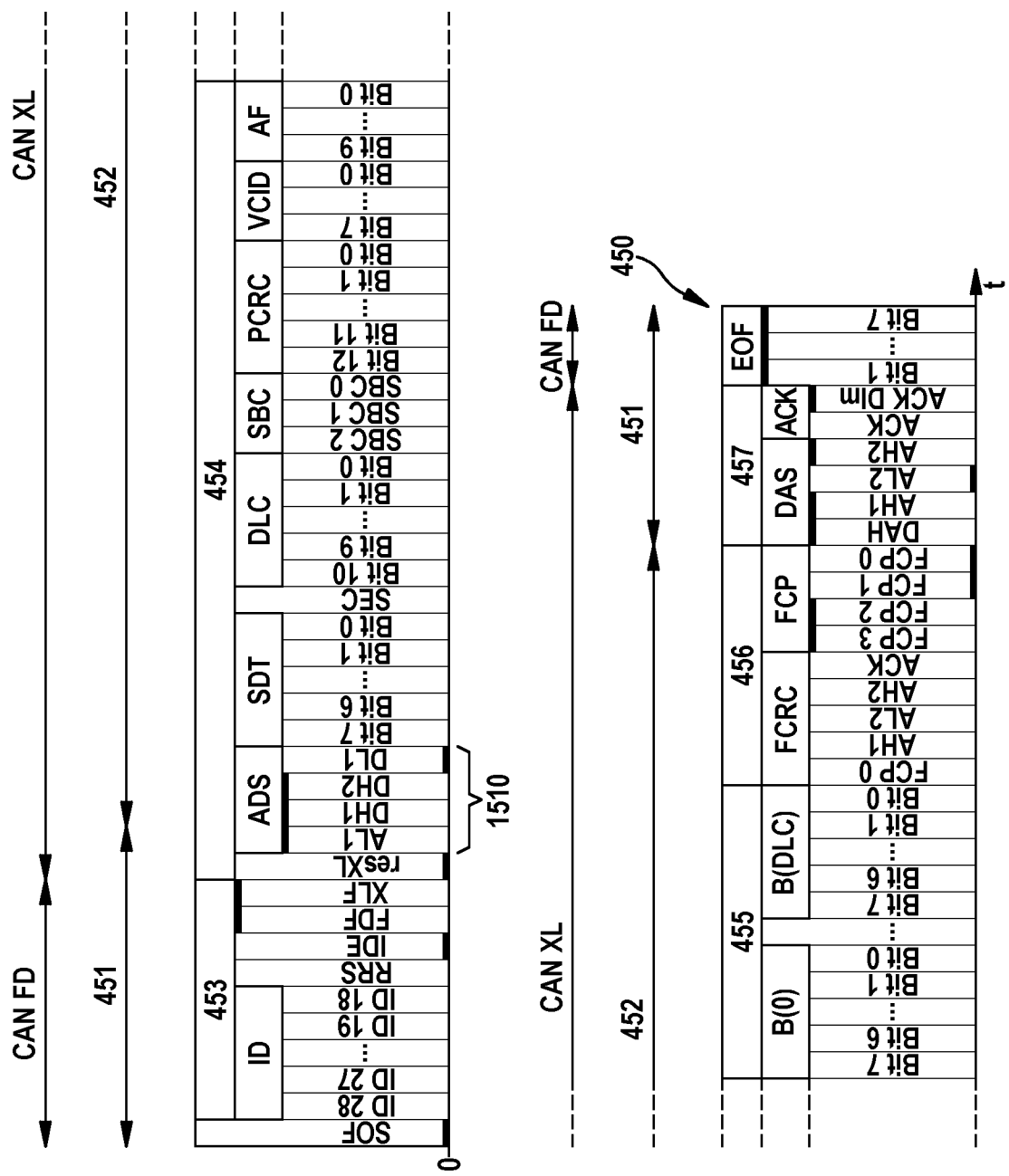
FIG. 2 shows a diagram illustrating the structure of a message that can be sent by a subscriber station of the bus system according to the first exemplary embodiment of the present invention.

FIG. 2 shows a CAN XL frame 450 for message 45, as provided by communication control device 11 for transceiver device 12 to transmit to bus 40. Here, communication control device 11 creates frame 450 in the present exemplary embodiment as compatible with CAN FD, as is also illustrated in FIG. 2. The same applies analogously to communication control device 31 and transceiver device 32 of subscriber station 30.

According to FIG. 2, CAN XL frame 450 for the CAN communication on bus 40 is divided into different communication phases 451, 452, namely an arbitration phase 451 and a data phase 452. After a start bit (SOF), frame 450 has an arbitration field 453, a control field 454 having an ADS field for switching between communication phases 451, 452, a data field 455, a checksum field 456, and a frame termination field 457 in which there is a DAS field for switching between communication phases 452, 451. There then follows a frame end field EOF.

In the arbitration phase 451, an identifier (ID) with, for example, bits ID28 to ID18 in the arbitration field 453 is used to negotiate bit by bit between subscriber stations 10, 20, 30 concerning which subscriber station 10, 20, 30 wishes to send message 45, 46 with the highest priority and will therefore be given exclusive access to bus 40 of bus system 1 for the next time period for transmission in the subsequent data phase 452. In arbitration phase 451, a physical layer is used as in CAN and CAN-FD. The physical layer corresponds to the bit transmission layer or layer 1 of the conventional OSI model (Open Systems Interconnection model).

An important point during phase 451 is that the conventional CSMA/CR method is used, which allows simultaneous access of subscriber stations 10, 20, 30 to bus 40 without destroying the higher priority message 45, 46. This makes it relatively easy to add more bus subscriber stations 10, 20, 30 to bus system 1, which is very advantageous.

The CSMA/CR method has the consequence that there have to be so-called recessive states on bus 40, which can be overwritten by other subscriber stations 10, 20, 30 with dominant states on bus 40. In the recessive state, high-impedance conditions prevail at the individual subscriber station 10, 20, 30, which, in combination with the parasitic characteristics of the bus circuitry, results in longer time constants. This causes a limitation of the maximum bit rate of the CAN-FD physical layer as used today to, currently, about 2 megabits per second in real vehicle use.

In data phase 452, the user data of the CAN-XL frame or of message 45 from data field 455, as well as the checksum field 456, are transmitted in addition to a part of control field 454. This is followed by the DAS field, which is used to switch from data phase 452 back to data phase 451.

A sender of message 45 does not begin a transmission of bits of data phase 452 to bus 40 until subscriber station 10, as the sender, has won the arbitration and subscriber station 10, as the sender, thus has exclusive access to bus 40 of bus system 1 for the transmission.

Quite generally, the following different properties can be realized in the bus system with CAN XL compared to CAN or CAN FD:

a) Adoption and, if necessary, adaptation of proven features responsible for the robustness and user-friendliness of CAN and CAN FD, in particular frame structure with identifier and arbitration according to the CSMA/CR method, b) Increasing the net data transfer rate, especially to about 10 megabits per second, c) Increasing the size of the useful data per frame, in particular to about 2 kbytes or any other value.

As shown in FIG. 2, in arbitration phase 451 as the first communication phase, subscriber station 10 partially uses, in particular up to the FDF bit (inclusive), a format from CAN/CAN-FD according to ISO 11898-1:2015. In contrast, starting from the FDF bit in the first communication phase as well as in the second communication phase, data phase 452, subscriber station 10 uses a CAN XL format that is described below.

In the present exemplary embodiment, CAN XL and CAN FD are compatible. Here the res bit from CAN FD, which is called XLF bit in the following, is used for the switch from the CAN FD format to the CAN XL format. Therefore, the frame formats of CAN FD and CAN XL are the same up to the res bit, or XLF bit. A receiver recognizes only at the res bit the format in which frame 450 is sent. A CAN XL subscriber station, i.e. here subscriber stations 10, 30, also supports CAN FD.

As an alternative to the frame 450 shown in FIG. 2, in which an identifier ID28 to ID18 with 11 bits is used, a CAN XL extended frame format is optionally possible in which an identifier with 29 bits is used. This is identical, up to the FDF bit, to the CAN FD extended frame format from ISO 11898-1:2015.

According to FIG. 2, frame 450 from the SOF bit up to and including the FDF bit is identical to the CAN FD base frame format according to ISO 11898-1:2015. Therefore, the conventional structure is not further explained here. Bits shown with a thick stroke at their bottom line in FIG. 2 are sent as dominant or '0' in frame 450. Bits shown with a thick stroke at their top line in FIG. 2 are sent as recessive or '1' in frame 450. In CAN XL data phase 452, symmetrical '1' and '0' levels are used instead of recessive and dominant levels.

In general, two different stuffing rules are applied when generating frame 450. Up to before the FDF bit in arbitration field 453, the dynamic bit stuffing rule of CAN FD applies, so that an inverse stuff bit is to be inserted after 5 equal bits in a row. In data phase 452 up to before the FCP field, a fixed stuffing rule applies, so that a fixed stuff bit is to be inserted after a fixed number of bits. Alternatively, instead of just one stuff bit, a number of 2 or more bits can be inserted as fixed stuff bits.

In frame 450, directly after the FDF bit there follows the XLF bit, which corresponds in position to the "res bit" in the CAN FD base frame format, as mentioned above. If the XLF bit is sent as 1, i.e., recessive, it thus identifies frame 450 as a CAN XL frame. For a CAN FD frame, communication control device 11 sets the XLF bit as 0, i.e. dominant.

The XLF bit is followed in frame 450 by a resXL bit, which is a dominant bit for future use. The resXL must be sent as 0, i.e. dominant, for frame 450. However, if subscriber station 10 receives a resXL bit as 1, i.e. recessive, the receiving subscriber station 10 goes for example into a protocol exception state, as executed for a CAN FD message 46 for a res=1. Alternatively, the resXL bit could be defined exactly conversely, i.e. that it has to be sent as 1, i.e. recessive. In this case, the receiving subscriber station goes into the protocol exception state when there is a dominant resXL bit.

The resXL bit is followed in frame 450 by a sequence ADS (Arbitration Data Switch) in which a predetermined bit sequence is encoded. This bit sequence allows simple and safe switching from the bit rate of the arbitration phase 451 (arbitration bit rate) to the bit rate of the data phase 452 (data bit rate). Optionally, within the ADS field the physical layer in transceiver device 12, 22, 32 is switched over. In this case, the operating mode of transceiver 12, 32 is also switched over during the sequence ADS. The bit sequence of the ADS field has an AL1 bit which is sent as a logical 1 at least in its last part, for example the last 50% of the bit. The AL1 bit is the last bit of arbitration phase 451. The three following bits DH1, DH2 and DL1 are already sent with the data bit rate. Thus, in CAN XL the bits DH1, DH2, and DL1 are temporally short bits of data phase 452. The bits DH1 and DH2 each have the logical value 1. The last bit is bit DL1, which has the logical value 0. The receive nodes synchronize to the falling edge of bit DL1 after the bit rate switching. The ADS field is used for the transition from first communication phase 451 to second communication phase 452.

The sequence ADS is followed in frame 450 by an SDT field that identifies the content of data field 455. The content of the SDT field indicates what kind of information is contained in data field 455. For example, the SDT field indicates whether there is an "Internet Protocol" (IP) frame in data field 455, or a tunneled Ethernet frame, or something else.

The SDT field is followed by an SEC field that indicates whether frame 450 is secured with the CAN security protocol or not. The SEC field is 1 bit wide and, like the SDT field, has the function of indicating what type of information is contained in data field 455.

The SEC field is followed by a DLC field in which the data length code (DLC) is inserted, which indicates the number of data bytes in data field 455 of frame 450. The data length code (DLC) can take any value from 1 up to the maximum number of bytes of data field 455, or the data field length. If the maximum data field length is in particular 2048 bits, the data length code (DLC) requires a number of 11 bits under the assumptions that DLC=0 means a data field length with a number of 1 byte and DLC=2047 means a data field length with a number of 2048 bytes data field length. Alternatively, a data field 455 of length 0 could be allowed, as for example in CAN. Here, for example, DLC=0 would encode the data field length with the number of 0 bytes. The maximum codable data field length with, for example, 11 bits is then $(2^{11})-1=2047$.

The DLC field is followed in frame 450 by an SBC (stuff bit count) bit counter field. This field indicates the number of dynamic stuff bits that were sent in arbitration field 453. A receiving node uses the information of the SBC bit counter field to check whether the receiving node has received the correct number of dynamic stuff bits.

Following the SBC bit counter field is a preamble checksum PCRC, also called a preface CRC. The preamble checksum PCRC is a checksum for securing the frame format of frame 450, that is, all variable bits from the beginning of frame 450 with the SOF bit to the beginning of the preamble checksum PCRC, including all the dynamic and optionally the fixed stuff bits up to the beginning of the preamble checksum PCRC. The length of preamble checksum PCRC and thus of the checksum polynomial according to the cyclic redundancy check (CRC) has to be selected according to the desired Hamming distance.

The preamble checksum PCRC is followed in frame 450 by a field VCID (Virtual CAN Bus ID). The VCID field has a length of 1 byte. The VCID field contains the number of a virtual CAN bus.

The field VCID is followed in frame 450 by a field AF (Acceptance Field). The AF field has a length of 32 bits. The AF field contains an address or some other value for an acceptance filtering.

The field AF is followed in frame 450 by data field 455 (data field). Data field 455 is made up of P bytes B, where P is encoded in the DLC field as described above. P is a natural number greater than or equal to 1.

The data field 455 is followed in frame 450 by checksum field 456 with a frame checksum FCRC and an FCP field. The frame checksum FCRC is made up of the bits of the frame checksum FCRC. The length of frame checksum FCRC and thus of the CRC polynomial is to be selected according to the desired Hamming distance. The frame check sum FCRC secures the overall frame 450. Alternatively, optionally only data field 455 is protected with frame checksum FCRC.

The frame check sum FCRC is followed in frame 450 by the FCP field, where FCP=Frame Check Pattern. The FCP field is made up of 4 bits having in particular the bit sequence 1100. A receive node uses the FCP field to check whether the receive node is bit-synchronous with the transmit data stream. In addition, a receiving node synchronizes to the falling edge in the FCP field.

The FCP field is followed by frame termination field 457. Frame termination field 457 is made up of two fields, namely the DAS field and the acknowledgment field or ACK field with the at least one bit ACK and the bit ACK-Dlm.

The DAS field contains the sequence DAS (Data Arbitration Switch), in which a predetermined bit sequence is encoded. The bit sequence DAH, AH1, AL2 allows simple and safe switching from the data bit rate of data phase 452 to the arbitration bit rate of arbitration phase 451. In addition, during the DAS field the operating mode of transceiver 12, 32 is optionally switched from an operating mode FAST to operating mode SLOW. In FIG. 2, the DAS field has the bits DAH, AH1, AL2, AH2. The AH2 bit at the end of the DAS field is optionally provided. Bit AH2 is used for maintaining distance to the acknowledgment field (ACK). The DAS field has at least three bits. For example, the bit sequence of the sequence DAS has an arbitration bit DAH and an arbitration bit AH1, each of which has the logical value 1. Within the DAH bit, the physical layer, i.e. the operating mode of transceiver 12, 32, is switched from FAST_TX or FAST_RX to SLOW. Bit AH1 is followed by bit AL2 (logical 0) and bit AH2 (logical 1). The two bits DAH and AH1 are used to ensure that there is enough time for the transceiver device 11 to switch operating modes, and that all subscriber stations 10, 30 see a recessive level of significantly more than one arbitration bit time before the edge at the beginning of the AL2 bit (logic 0). This ensures reliable synchronization of the subscriber stations of the bus system, which currently re-integrate to the communication on the bus.

In frame terminating field 457, the sequence of the DAS field is followed by the acknowledgment field (ACK). In the confirmation field, bits are provided for the confirmation or non-confirmation of a correct reception of frame 450. In the example of FIG. 2, one ACK bit and one ACK-dlm bit are provided.

Optionally, a NACK bit and a NACK-dlm bit may also be provided. The ACK bit is sent by the receiving subscriber stations 10, 30 as dominant when they have correctly received frame 450. The sending subscriber station sends the ACK bit as recessive. Therefore, the bit originally sent to bus 40 in frame 450 can be overwritten by the receiving subscriber stations 10, 30. The ACK-dlm bit is sent as a recessive bit used for separation from other fields. The NACK bit and the NACK-dlm bit are used to allow a receiving subscriber station to signal an incorrect reception of frame 450 on bus 40. The function of the bits is like that of the ACK bit and the ACK-dlm bit.

Frame termination field 457 is followed in frame 450 by an end field (EOF=End of Frame). The bit sequence of the end field (EOF) marks the end of frame 450. The end field (EOF) ensures that a number of 8 recessive bits is sent at the end of frame 450. This is a bit sequence that cannot occur within frame 450. As a result, the end of frame 450 can be reliably recognized by subscriber stations 10, 20, 30.

The end field (EOF) has a length that varies as a function of whether a dominant bit or a recessive bit was seen in the ACK bit. If the sending subscriber station has received the ACK bit as dominant, then the end field (EOF) has a number of 7 recessive bits. Otherwise, the end field (EOF) is only 5 recessive bits long.

After the end field (EOF), in the frame 450 there follows an interframe space (IFS), which is not shown in FIG. 2. This interframe space (IFS) is formed as in CAN FD according to ISO11898-1:2015.

Figure 3:
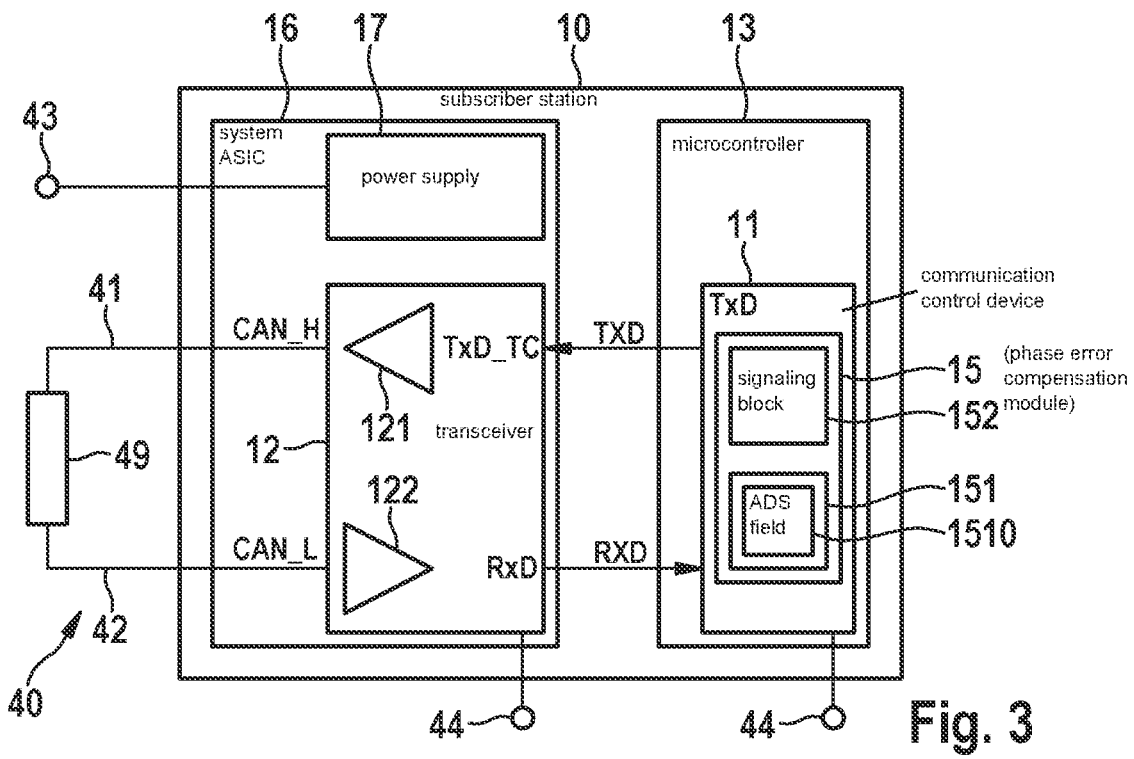
FIG. 3 shows a simplified schematic block diagram of a subscriber station of the bus system according to the first exemplary embodiment of the present invention.

FIG. 3 shows the basic structure of subscriber station 10 with communication control device 11, transceiver device 12, and phase error compensation module 15, which is part of communication control device 11. Subscriber station 30 is constructed in manner similar to that shown in FIG. 3, but phase error compensation module 35 according to FIG. 1 is situated separately from communication control device 31 and transceiver device 32. Therefore, subscriber station 30 is not described separately.

According to FIG. 3, subscriber station 10 has, in addition to communication control device 11 and transceiver device 12, a microcontroller 13 to which communication control device 11 is assigned, and a system ASIC 16 (ASIC=application-specific integrated circuit), which may alternatively be a system base chip (SBC) on which a plurality of functions necessary for an electronics assembly of subscriber station 10 are combined. System ASIC 16 has built into it, in addition to transceiver 12, a power supply device 17 that supplies electrical power to transceiver 12. Power supply device 17 usually supplies a voltage CAN_Supply of 5 V. However, depending on requirements, power supply device 17 can supply a different voltage with a different value. In addition or alternatively, power supply device 17 may be fashioned as a current source.

Phase error compensation module 15 has an insertion block 151 that inserts a predetermined ADS field 1510 into frame 450, and a signaling block 152. Blocks 151, 152 are described in more detail below.

Transceiver device 12 also has a transmitter module 121 and a receiver module 122. Although in the following reference is always made to transceiver device 12, it is alternatively possible to provide receiving module 122 in a separate device external to transmitting module 121. Transmitting module 121 and receiving module 122 may be constructed as in a conventional transceiver device 22. In particular, transmitter module 121 may include at least one operational amplifier and/or a transistor.

In particular, receiving module 122 may include at least one operational amplifier and/or a transistor.

Transceiver 12 is connected to bus 40, more specifically its first bus wire 41 for CAN_H or CAN-XL_H and its second bus wire 42 for CAN_L or CAN-XL_L. The voltage supply for power supply device 17 for supplying first and second bus wires 41, 42 with electrical energy, in particular with the voltage CAN-Supply, is provided via at least one terminal 43. The connection to ground or CAN_GND is realized via a terminal 44. First and second bus wires 41, 42 are terminated with a terminating resistor 49.

In transceiver device 12, first and second bus wires 41, 42 are connected not only to transmitting module 121, which is also referred to as the transmitter, but also to receiving module 122, which is also referred to as the receiver, although the connection is not shown in FIG. 3 for simplicity.

In the operation of bus system 1, transmitting module 121 converts a transmit signal TXD or TxD of communication control device 11 into corresponding signals CAN-XL_H and CAN-XL_L for bus wires 41, 42, and transmits these signals CAN-XL_H and CAN-XL_L to bus 40 at the terminals for CAN_H and CAN_L.

Figure 4:
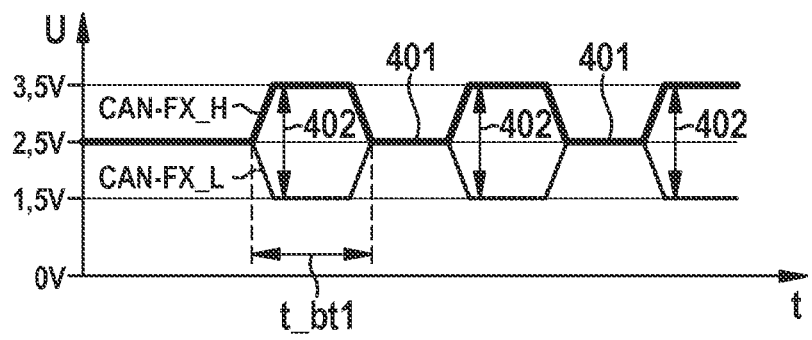
FIG. 4 shows a temporal course of bus signals CAN-XL_H and CAN-XL_L in the subscriber station according to the first exemplary embodiment of the present invention.

Receiving module 122 forms a receive signal RXD or RxD from signals CAN-XL_H and CAN-XL_L received from bus 40, as shown in FIG. 4, and forwards this receive signal to communication control device 11, as shown in FIG. 3. With the exception of an idle or standby state, transceiver 12 with receiver module 122 always listens for a transmission of data or messages 45, 46 on bus 40 during normal operation, independently of whether transceiver 12 is the sender of message 45 or not.

Figure 5:
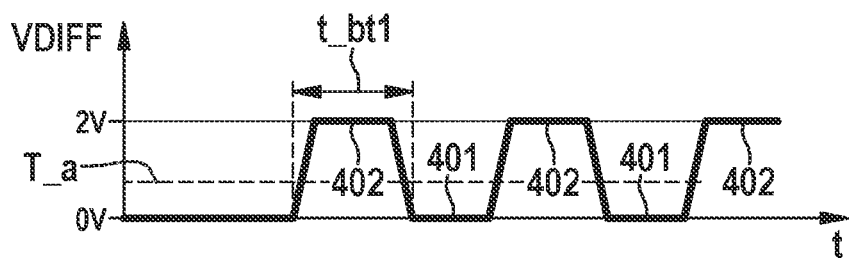
FIG. 5 shows a temporal course of a differential voltage VDIFF of bus signals CAN-XL_H and CAN-XL_L in the subscriber station according to the first exemplary embodiment of the present invention.

According to the example of FIG. 4, the CAN-XL_H and CAN-XL_L signals have dominant and recessive bus levels 401, 402, as from CAN, at least in arbitration phase 451. A difference signal VDIFF=CAN-XL_H−CAN-XL_L is formed on bus 40, which is shown in FIG. 5 for arbitration phase 451. The individual bits of the signal VDIFF with bit time t_bt1 can be detected in arbitration phase 451 with a reception threshold T_a of for example 0.7 V. In data phase 452, the bits of signals CAN-XL_H and CAN-XL_L are sent faster, i.e. with a shorter bit time t_bt2, than in arbitration phase 451. This is described in more detail on the basis of FIG. 6 to FIG. 9. Thus, the signals CAN-XL_H and CAN-XL_L in data phase 452 differ from the conventional signals CAN_H and CAN_L at least in their faster bit rate.

The sequence of states 401, 402 for the signals CAN-XL_H, CAN-XL_L in FIG. 4 and the resulting course of the voltage VDIFF in FIG. 5 are provided only to illustrate the function of subscriber station 10. The sequence of the data states for bus states 401, 402 can be selected as needed.

In other words, according to FIG. 4, when the transmitter module 121 is switched to a first operating mode B_451 (SLOW), it generates a first data state as bus state 402 with different bus levels for two bus wires 41, 42 of the bus line and a second data state as bus state 401 with the same bus level for the two bus wires 41, 42 of the bus line of bus 40.

Furthermore, for the temporal courses of the signals CAN-XL_H, CAN-XL_L, in a second operating mode B_452_TX (FAST_TX) that comprises data phase 452, transmit module 121 transmits the bits to bus 40 with a higher bit rate. The CAN-XL_H and CAN-XL_L signals can in addition be generated in data phase 452 with a different physical layer than in CAN FD. In this way, the bit rate in data phase 452 can be increased still further than with CAN FD. A subscriber station that is not a transmitter of frame 450 in data phase 452 sets a third operating mode B_452_RX (FAST_RX) in its transceiver device.

To signal the switchover from operating mode B_451 to operating mode B_452_TX (FAST_TX) or operating mode B_452_RX (FAST_RX), communication control device 11 carries out a pulse width modulation (PWM) of the transmit signal TxD. For this purpose, communication control device 11 uses one or more PWM symbols per logical bit of CAN XL frame 450. Basically, a PWM symbol is made up of two phases, namely a 0-phase and a 1-phase. Moreover, a PWM symbol is bounded by two equal edges, for example by two rising edges.

Phase error compensation module 15 of FIG. 3, in particular its insertion block 151, is used to insert ADS field 1510 into frame 450 when subscriber station 10 acts as sender of frame 450. In addition, phase error compensation module 15, in particular its signaling block 152, can perform pulse width modulation (PWM) as described below for switching between the operating modes B_451 (SLOW) and B_452_TX (FAST_TX).

FIG. 6 shows, over time t, the resulting digital transmit signal TxD in the region of the switchover from arbitration phase 451 to data phase 452 of a frame 450, in other words at the transition from phase 451 to phase 452. ADS field 1510 is inserted into frame 450 after the bit resXL. Transmit signal TxD is transmitted serially by communication control device 11 as the transmitter of frame 450 to transceiver device 12, as described in more detail below. Up to and including bit AL1, the bits of frame 450 have a bit duration t_bt1. Starting from bit DH1, the first bit of data phase 452, the bits of frame 450 have a bit duration t_bt2. Bit duration t_b2 is shorter than bit duration t_bt1 in the example of FIG. 6.

As shown in FIG. 1, the AL1 bit is sent with the logical value 1 in the present exemplary embodiment.

FIG. 7 shows the states resulting over time t from the transmit signal TxD, which occur serially at the TXD terminal between communication control device 11 and transceiver device 12. For this purpose, communication control device 11, for example phase error compensation module 15, in particular signaling block 152, carries out the pulse width modulation (PWM) of transmit signal TxD of FIG. 6 in data phase 452. More precisely, the pulse width modulation (PWM) of transmit signal TxD of FIG. 6 starts with the AL1 bit. In arbitration phase 451 before the AL1 bit, no pulse width modulation (PWM) of the transmit signal TxD takes place.

At the end of arbitration phase 451, transceiver 12 detects, based on the high frequency of the edges of the signal at the TXD terminal, that transceiver 12 should change from operating mode B_451 of the arbitration phase to one of the fast operating modes B_452_TX (FAST_TX), B_452_RX (FAST_RX), or should remain there. By the value of the first PWM symbol or of the S first symbols, transceiver 12 recognizes whether it is to switch to the operating mode B_452_TX (FAST_TX) or the operating mode B_452_RX (FAST_RX). S is a natural number greater than or equal to 1. The signal at the TXD terminal is delayed by a time period T_V1 compared to the TxD signal due to the PWM coding carried out. The signaling block 152 generates the first S PWM symbols according to the operating mode to which the transceiver device is to be switched, and not as a function of the value of the AL1 bit.

In the example in FIG. 7, for a PWM symbol SB_D0 the 0 phase is longer than the 1 phase, which corresponds to a bit in data phase 452 with logical value 0 in transmit signal TxD. In contrast, for a PWM symbol SB_D1 the 1-phase is longer than the 0-phase, which corresponds to a bit with logical value 1. Of course, the PWM symbols SB_D0, SB_D1 can be defined differently, in particular exactly conversely to the above description.

In addition, the first two PWM symbols in the signal at the TXD terminal in the example of FIG. 7 have the logical value 0 (SB_D0). Transceiver 12, 32 evaluates the first two PWM symbols in order to decide to which operating mode transceiver 12, 32 is to be switched. In the present example of FIG. 7, transceiver device 12, 32 of the transmit node is to switch to the operating mode B_452_TX (FAST_TX) on the basis of the two PWM symbols with the logical value 0. The switch to the B_452_RX (FAST_RX) operating mode is signaled with at least one other value of the two first PWM symbols in the AL1 bit.

As shown in FIG. 7, communication control device 11, for example phase error compensation module 15, in particular signaling block 152, carries out the subsequent pulse width modulation (PWM) of the AL1 bit of transmit signal TxD of FIG. 6 in such a way that all subsequent PWM symbols of the AL1 bit are transmitted with the logical value 1. Thus, only symbols SB_D1 are present in the second part of the AL1 bit, the part after the signaling of the type of operating mode B_452 of transceiver 12, 32 for data phase 452.

After data phase 452, the pulse width modulation (PWM) of the transmit signal TxD ends, since no pulse width modulation (PWM) of the transmit signal TxD takes place in arbitration phase 451, as described above. The switchover from operating mode B_452_TX (FAST_TX) or operating mode B_452_RX (FAST_RX) FAST_RX to operating mode B_451 (SLOW) is signaled by shutting off the PWM coding and thus by the absence of the many edges.

FIG. 8 shows the temporal course of a signal TxD_TC decoded by transceiver 12 from the states at terminal TXD in FIG. 7. In the example of FIG. 8, transceiver device 12 switches its operating mode B_451, in which the frame has 450 bits with bit duration t_bt1, in bit AL1 to operating mode B_452_TX (FAST_TX), in which frame 450 has bits with bit duration t_bt2. In addition, the bits of frame 450 in operating mode B_451 can be sent to bus 40 using a different physical layer than in operating mode B_452_TX, as described above.

Thus, transceiver 12 decodes the states at terminal TXD of FIG. 7 into signal TxD_TC according to FIG. 8. For the AL1 bit, for the first part AL1_0 of the AL1 bit there results a logical value 0. For the second and last part AL1_1 of the AL1 bit in FIG. 8, a logical value of 1 results.

Each of the PWM symbols SB_D0, SB_D1 at terminal TXD can be decoded only at the end of the respective PWM symbol SB_D0, SB_D1. Thus, the decoding in transceiver device 12 inserts an additional delay period T_V2 into signal TxD_TC that is to be transmitted serially to bus 40. The delay time duration T_V2 is equal to the time duration of a symbol length of one of the PWM symbols SB_D0, SB_D1, as shown in FIG. 8. The phase error T_P, which is generated once in the transmitting subscriber station by the PWM coding and decoding, is T_P=T_V1+T_V2.

After transceiver 12 has decoded the states at terminal TXD of FIG. 7 into the TxD_TC signal according to FIG. 8, transceiver 12 transmits signal TxD_TC to bus 40 as differential voltage VDIFF.

FIG. 9 shows the course over time t of a signal RxD_E, which the receiving subscriber station (receiving node), in particular its communication control device, expects at its RXD terminal. Here, the receiving subscriber station (receiving node), in particular its communication control device, does not expect a predetermined value for bit AL1, as is illustrated by the hatching in FIG. 9. In other words, the value for bit AL1 can be logical 1 or logical 0. Moreover, the receiving subscriber station (receiving node), in particular its communication control device, samples bit DH1, the first bit of data phase 452, at a sampling time t1.

According to FIG. 9, there is a large phase error T_P1=T_V1+T_V2+"phase error due to clock tolerance" between the expected receive signal RxD_E of FIG. 8 and the actual receive signal, which is identical to signal TxD_TC of FIG. 8. T_P1 is the distance from the start of the DH1 bit in FIG. 9 to the start of the DH1 bit in FIG. 8. However, the signal runtime, in particular via bus 40, is not taken into account here and is not shown in FIG. 6 to FIG. 9, because the signal runtime has no influence on the phase error T_P1.

Despite the large phase error T_P1, the receiving node correctly samples bit DH1, the first bit of data phase 452, as logical 1.

The reason for this is that bit AL1, in its last part AL1_1, is already sent with the logical value 1, as can be seen by comparing FIG. 8 and FIG. 9.

In addition, starting with the bit position of DH1, a receiving node tolerates a number of from 1 to N bits sampled in direct succession with the logical value 1. N is a natural number greater than or equal to 1. In other words, after receiving the DH1 bit as logical 1, the receiving node tolerates, if the receiving node samples additional zero to N−1 bits of second communication phase 452 with logical 1 before the receiving node detects the falling edge in the ADS field. For the bit rate ratios aimed at in CAN XL, as described above in relation to the object to be solved, and phase errors that are to be expected, a value of N=5 is advantageous or reasonable.

The next falling edge after the DH1 bit signals the start of the DL1 bit for the receiving node. All receiving nodes synchronize to this next falling edge after the DH1 bit.

Thus, as shown in FIG. 6 through FIG. 9, phase error compensation module 15 of FIG. 3 is realized in the present exemplary embodiment in such a way that the ADS field has an AL1 bit at its beginning, which is sent as logical 1 at least in its last part AL1_1, which can correspond for example to more than 50% of the AL1 bit. Based on a signaling in the first part AL1_1 of the AL1 bit, transceiver 12 carries out the switching of its operating mode from operating mode B_451 (SLOW) to operating mode B_452_TX (FAST_TX).

As a result, the ADS field is realized in such a way that it is ensured that not only the first bit DH1 of data phase 452 can be correctly sampled, but also a synchronization between the transmitting node and the receiving node is carried out so that all bits of the data phase starting from the DL1 bit can also be correctly sampled.

FIG. 10 through FIG. 12 show temporal courses according to a second exemplary embodiment, which differ from the temporal courses of FIG. 6 through FIG. 10 in the following aspects.

Differing from the first exemplary embodiment, in the second exemplary embodiment there is no switchover of the operating mode of transceiver devices 12, 32. This holds in particular for the change between communication phases 451, 452. Because of this, there also takes place no pulse width modulation (PWM) for a coding of the signaling in transmit signal TxD of FIG. 10, generated by the associated communication control device 11, 31, in particular its protocol controller.

Thus, the signal TxD_TC according to FIG. 11, which transceiver 12, 32 drives to bus 40 as differential voltage VDIFF when transceiver 12, 32 acts as a transmit node, is identical to transmit signal TxD of FIG. 10. Since no PWM coding and therefore also no decoding takes place, no unique phase error T_P is generated between transmit signal TxD_TC in transceiver 12, 32 and transmit signal TxD. Signal runtimes are not shown in FIG. 10 through FIG. 12 because they have no influence on phase error T_P0 and are therefore not relevant here.

In order to robustly carry out the switchover from first communication phase 451 to second communication phase 452 despite a possible large phase error T_P0 between a transmitting and receiving node, communication control device 11, 31, in particular its protocol controller, proceeds as follows.

As shown in FIG. 10, communication control device 11, 31, in particular its protocol controller, inserts, directly after bit DH1, at least one additional bit, or 1 to M additional bits, that have the same value as first bit DH1 of data phase 452. In the example of FIG. 10, communication control device 11, 31, in particular its protocol controller, has inserted bit DH2 directly after bit DH1, i.e. M=1 additional bit. M is a natural number greater than or equal to 1. The M bits each have the bit time t_bt2. Thus, bit AL1 is sent completely with logical value 1, as shown with signal TxD_TC of FIG. 11, so that transceiver 12, 32 can drive as a differential voltage VDIFF onto bus 40.

FIG. 12 shows the course over time t of a signal RxD_E, which the receiving subscriber station (receiving node), in particular its communication control device, expects at its RXD terminal. Here, the receiving subscriber station (receiving node), in particular its communication control device, does not expect a predetermined value for bit AL1, as is illustrated by the hatching in FIG. 12. In other words, the value for bit AL1 can be logical 1 or logical 0.

According to FIG. 12, there is a large phase error T_P0="phase error due to clock tolerance" between the expected receive signal RxD_E of FIG. 12 and the actual receive signal, which is identical to signal TxD_TC of FIG. 11. T_P0 is the distance from the start of the DH1 bit in FIG. 11 to the start of the DH1 bit in FIG. 12. The phase error T_P0 is referred to as large because it is large in comparison with the bit time t_bt2 of the second communication phase. However, the signal runtime, in particular via bus 40, is not taken into account here and is not shown in FIG. 10 to FIG. 12, because the signal runtime has no influence on the phase error T_P0.

As a consequence of phase error T_P0, the receiving subscriber station (receiving node), in particular its communication control device, samples bit DH1, the first bit of data phase 452, at sampling time t1. Thus, the receiving node samples the DH1 bit while the DH2 bit is being transmitted, as is shown in FIG. 12.

However, starting with the bit position of DH1, the receiving node tolerates a number of from 1 to N bits sampled in direct succession with the logical value 1. The receiving node can skip over this additional N−1 bit or bits directly after the DH1 bit by synchronization. N is a natural number greater than or equal to 1. For the bit rate ratios aimed at in CAN XL, as described above in relation to the object to be solved, and phase errors that are to be expected, a value of N=1 is advantageous or reasonable.

Despite the phase error T_P0, the receiving node thus correctly samples bit DH1, the first bit of data phase 452, as logical 1. The reason for this is that after bit DH1 another bit DH2 with the same logical value is sent.

As in the first exemplary embodiment, the next falling edge after the DH1 bit defines the start of the DL1 bit. All receiving nodes synchronize to this next falling edge after the DH1 bit.

The exemplary embodiment described above of communication control device 11, 31 can compensate for a phase error T_P0 resulting for example from a transmitting node and a receiving node each using a clock source having a tolerance. As a result, it is no longer a problem if, due to the tolerance of the clock sources, a slow receiving node is significantly "behind" the transmitting node. Depending on the bit rate ratio of data phase bit rate to arbitration phase bit rate, this can be up to a plurality of data phase bits of phase error T_P0.

Therefore it is not a problem that the receiving node does not attempt to sample the DH1 bit until after the DH1 bit has already passed in the transmit signal (TxD_TC).

In all other respects, the functioning of bus system 1 of the two exemplary embodiments is the same.

Thus, compared to the current existing art, the logical level of the first bit in data phase 452 is lengthened in both directions so that both the sample point t1 of a fast receiver or receive node and the sample point t1 of a slow receiver or receive node correctly samples the value of first bit DH1 in data phase 452 as 1. In this case, for a lengthening backward, that is, in the direction of the end of frame 450, immediately after the DH1 bit at least one new bit DH2 is introduced that has the same value as first bit DH1 of data phase 452. This at least one bit DH2 can be skipped over by the receiver, or receiving node, by synchronization. Alternatively or in addition, for a lengthening forward, that is, in the direction of the beginning of frame 450, at least the rear or last portion AL1_1 of the AL1 bit can be sent with the same value as the DH1 bit.

All of the exemplary embodiments described above of subscriber stations 10, 20, 30, of bus system 1, and of the method carried out therein may be used individually or in all possible combinations. In particular, all features of the exemplary embodiments described above and/or modifications thereof may be combined in any manner desired. In addition or alternatively, in particular the following modifications are possible.

Although the present invention is described above using the CAN bus system as an example, the present invention can be used in any communication network and/or communication method in which two different communication phases are used in which the bus states generated for the different communication phases differ. In particular, the present invention can be used in developments of other serial communication networks, such as Ethernet and/or 100 Base-T1 Ethernet, field bus systems, etc.

In particular, bus system 1 according to the exemplary embodiments can be a communication network in which data can be transmitted serially with two different bit rates. It is advantageous, but not a necessary condition, that an exclusive, collision-free access of a subscriber station 10, 20, 30 to a common channel is ensured in bus system 1 at least for certain periods of time.

Of course, the ADS field can have more bits than those described in the exemplary embodiments.

The number and configuration of subscriber stations 10, 20, 30 in bus system 1 of the exemplary embodiments is arbitrary. In particular, subscriber station 20 may be omitted in bus system 1. It is possible for one or more of subscriber stations 10 or 30 to be present in bus system 1. It is possible for all subscriber stations in bus system 1 to have the same design, i.e. only subscriber station 10 or only subscriber station 30 are present.

What is claimed is:

1. A subscriber station for a serial bus system, comprising:
    a communication control device configured to control a communication of the subscriber station with at least one other subscriber station of the bus system and to generate a transmit signal, so that, for a message exchanged between subscriber stations of the bus system, a bit time of a signal transmitted to a bus of the bus system in a first communication phase can differ from a bit time of a signal transmitted in a second communication phase;
    wherein the communication control device is configured to generate the transmit signal according to a frame and to insert a field with a rising edge and a subsequent falling edge into the frame for a transition from the first communication phase to the second communication phase, and the field between the rising edge and the subsequent falling edge having a predetermined length such that a sampling time at which a communication control device of the at least one other subscriber station of the bus system will sample a first bit of the second communication phase is located between the rising edge and the subsequent falling edge.

2. The subscriber station as recited in claim 1, wherein the predetermined length of the field having at least three bits with the bit time of the second communication phase.

3. The subscriber station as recited in claim 1, wherein the falling edge defines a start of a predetermined bit of the second communication phase.

4. The subscriber station as recited in claim 1, wherein the communication control device is configured to insert the field as a bit sequence having a logical value 1110.

5. The subscriber station as recited in claim 1, wherein the communication control device is configured to insert, in the field before the falling edge, a bit with the bit time of the first communication phase and subsequently to insert a bit with the bit time of the second communication phase, the communication control device being configured to additionally insert, following the bit with the bit time of the second communication phase, a number of M bits with the bit time of the second communication phase, each having a same logical value as the first bit of the second communication phase, M being a natural number greater than or equal to 1.

6. The subscriber station as recited in claim 1, wherein the communication control device is configured to act as a receiving node in the second communication phase, so that the communication control device acts only as a receiver but not as a transmitter of the frame to the bus, and wherein the communication control device is configured to tolerate in the field, starting from and including a sampling time at which the communication control device samples the first bit of the second communication phase and before the falling edge of the field, a number of N bits with the bit time of the second communication phase each having a logical value 1, wherein N is a natural number greater than or equal to 1, and the communication control device is configured to use the falling edge of the field to synchronize to the communication on the bus.

7. The subscriber station as recited in claim 1, further comprising:
    a transceiver device configured to transmit the transmit signal to the bus of the bus system, the communication control device being configured to signal to the transceiver device by pulse width modulation in the transmit signal that the transceiver device has to switch its operating mode.

8. The subscriber station as recited in claim 7, wherein the communication control device is configured to signal to the transceiver device directly after the rising edge of the field, by pulse width modulation in the transmit signal, that the transceiver device has to switch its operating mode from an operating mode of the first communication phase to a different operating mode of the second communication phase.

9. The subscriber station as recited in claim 7, wherein the communication control device is configured to signal to the transceiver device, using S directly successive PWM symbols in the transmit signal, to which operating mode of the second communication phase the transceiver device has to switch its operating mode, where S is a natural number greater than or equal to 1.

10. The subscriber station as recited in claim 7, wherein the communication control device is configured to send at least a last part of a bit which has the bit time of the first communication phase with the same logical value as a first bit in the field, which has the bit time of the second communication phase.

11. The subscriber station as recited in claim 1, further comprising:
a transceiver device configured to transmit the transmit signal to the bus of the bus system, the transceiver device being configured to transmit the entire frame to the bus in an operating mode for transmitting and receiving the frame in the first communication phase.

12. The subscriber station as recited in claim 1, wherein the frame formed for the message is constructed to be compatible with CAN FD, and wherein it is negotiated in the first communication phase which of the subscriber stations of the bus system receives an at least temporarily exclusive, collision-free access to the bus in a subsequent second communication phase.

13. A bus system, comprising:
a bus; and
at least two subscriber stations that are connected to one another via the bus in such a way that they can communicate with each other serially and of which at least one subscriber station includes:
a communication control device configured to control a communication of the subscriber station with at least one other subscriber station of the bus system and to generate a transmit signal, so that, for a message exchanged between subscriber stations of the bus system, a bit time of a signal transmitted to the bus in a first communication phase can differ from a bit time of a signal transmitted in a second communication phase;
wherein the communication control device is configured to generate the transmit signal according to a frame and to insert a field with a rising edge and a subsequent falling edge into the frame for a transition from the first communication phase to the second communication phase, and the field between the rising edge and the subsequent falling edge having a predetermined length such that a sampling time at which a communication control device of the at least one other subscriber station of the bus system will sample a first bit of the second communication phase is located between the rising edge and the subsequent falling edge.

14. A method for communication in a serial bus system, the method being carried out with a subscriber station of the bus system that has a communication control device and a transceiver device, the method comprising the following steps:
controlling, with the communication control device, a communication of the subscriber station with at least one other subscriber station of the bus system so that, for a message exchanged between subscriber stations of the bus system, a bit time of a signal transmitted to a bus of the bus system in a first communication phase can differ from a bit time of a signal transmitted in the second communication phase; and
transmitting, with the transceiver device, the transmit signal to the bus of the bus system,
wherein the communication control device generates the transmit signal according to a frame and inserts a field with a rising edge and a subsequent falling edge into the frame for a transition from the first communication phase to the second communication phase, the field having a predetermined length between the rising edge and the subsequent falling edge such that a sampling time at which a communication control device of the at least one other subscriber station of the bus system will sample a first bit of the second communication phase is located between the rising edge and the subsequent falling edge.

* * * * *